United States Patent [19]

Detering et al.

[11] Patent Number: 5,588,049
[45] Date of Patent: Dec. 24, 1996

[54] METHOD FOR THE AUTOMATIC INSERTION OF REMOVAL OF A CALLING NUMBER IDENTIFICATION (CNID) BLOCKING PREFIX FROM WITHIN A TELEPHONE NUMBER IN A PERSONAL COMPUTER BASED TELEPHONE MANAGEMENT SYSTEM

[76] Inventors: Greig R. Detering, 902 E. Marco Polo Rd., Phoenix, Ariz. 85024; Robert L. Gallick, 16220 N. 7th St., #3028, Phoenix, Ariz. 85022; James F. Hewell, 19402 N. 73rd La., Glendale, Ariz. 85308

[21] Appl. No.: 8,027

[22] Filed: Jan. 25, 1993

[51] Int. Cl.⁶ .............................. H04M 1/56; H04M 3/00; H04M 1/66; H04M 7/00
[52] U.S. Cl. ...................... 379/142; 379/197; 379/199; 379/201; 379/354; 379/355
[58] Field of Search .................................. 379/142, 197, 379/199, 201, 354, 355, 88, 96

[56] References Cited

U.S. PATENT DOCUMENTS

| | | | |
|---|---|---|---|
| 4,860,342 | 8/1989 | Danner | 379/354 |
| 5,033,076 | 7/1991 | Jones et al. | 379/199 |
| 5,062,133 | 10/1991 | Melrose | 379/199 |
| 5,070,525 | 12/1991 | Szlam et al. | 379/197 |
| 5,109,408 | 4/1992 | Greenspan | 379/197 |
| 5,119,417 | 6/1992 | Suzuki | 379/355 |
| 5,134,653 | 7/1992 | Satomi et al. | 379/354 |
| 5,161,181 | 11/1992 | Zwick | 379/142 |
| 5,189,696 | 2/1993 | Yoshida | 379/354 |
| 5,222,125 | 6/1993 | Creswell | 379/201 |
| 5,241,589 | 8/1993 | Jefferson | 379/355 |
| 5,268,958 | 12/1993 | Nakano | 379/142 |
| 5,268,959 | 12/1993 | Hong | 379/354 |
| 5,274,699 | 12/1993 | Ranz | 379/142 |
| 5,303,288 | 4/1994 | Duffy | 379/255 |
| 5,309,508 | 5/1994 | Rosen | 379/142 |
| 5,341,411 | 8/1994 | Hashimoto | 379/142 |
| 5,359,651 | 10/1994 | Draganoff | 379/354 |

FOREIGN PATENT DOCUMENTS

| | | | |
|---|---|---|---|
| 2251157 | 6/1992 | United Kingdom | 379/142 |

OTHER PUBLICATIONS

"Electronic Newsfront" by William Hawkins, Popular Science, Feb. 1990, pp. 38–39.
"All–in–One Home Office Hybrid"; Popular Science, May 1990, p. 92.
"New Connectivity" by Bryan Hastings. PC World, May 1993, p. 88.
"PC Dialog" by CMC.
"Blocked Caller ID explained" Fairfaxed [VA] Journal, Jun. 27, 1991.
"Looked Who's Calling" by Dawn Stover, Popular Science, Jul. 1990.
"Class Feature: Calling Number Delivery" Bellcore; Jun. 1988.

Primary Examiner—Stephen Chin
Assistant Examiner—Vijay Shankar

[57] ABSTRACT

With Calling Number Identification (CNID) service, Frequency Shift Keying (FSK) data is sent over the telephone lines to the telephone service customer. A telephone subscriber may prevent their name/number from being transmitted to the party they are calling on a per call basis by dialing a prefix before they dial the desired number. The present invention allows for the automatic insertion/removal of that prefix in the number stream when the called party's number is dialed. This feature is accomplished by inserting a $ character into the dialing sequence. If the blocking feature is enabled, the $ is translated to the numeric sequence necessary to prevent the transmittal of one's telephone number. In the alternative, the $ is translated to a meaningless delimiter if the feature is disabled.

2 Claims, 10 Drawing Sheets

Dialing Prefixes

Prefix Names:
- Internal
- Local
- Long Distance
- Northlake
- Block_outgoing_CID Prefix Definitions:
- $
- 9,$
- 9,$1,
- 8,452-
- $ OK   Cancel

Figure 3

Local Information

Calling Number ID Blocking Prefix:

56

Local Area Code

602

OK   Cancel

Figure 4

| Dialing Prefixes | |
|---|---|
| Prefix Names | Prefix Definitions |
| Internal | $ |
| Local | 9,$ |
| Long Distance | 9,$1, |
| Northlake | 8,452- |
| Block_outgoing_CID | $ |
| Transmit_CID_if_Available | |

OK    Cancel

Figure 9

METHOD FOR THE AUTOMATIC INSERTION OF REMOVAL OF A CALLING NUMBER IDENTIFICATION (CNID) BLOCKING PREFIX FROM WITHIN A TELEPHONE NUMBER IN A PERSONAL COMPUTER BASED TELEPHONE MANAGEMENT SYSTEM

FIELD OF THE INVENTION

The present invention relates to a PC accessory card and to a customer premises telephone call management product. More particularly, to an accessory card that receives Calling Number Identification (CNID) data for incoming calls and DTMF data for outgoing calls. The hardware consists of an accessory card and an external wall-plug power supply. The accessory card attaches to a standard telephone line with CNID service via an RJ-11 type connector. CNID data is collected for further processing by the accessory card. The present invention provides for a flexible means of entering the necessary information to prevent the central office telephone equipment from sending the CNID information.

BACKGROUND OF THE INVENTION

CNID data is sent from a telephone company central office over a standard telephone line to the subscriber. This data is sent as a burst of Bell 202 1200 baud asynchronous data between the first and second occurrence of ringing voltage. The most common CNID device marketed to subscribers is a free-standing LED or LCD display unit. This unit provides a display of the data and perhaps a limited storage of incoming call data. However, these units provide no means to export the data or of easily preventing the caller's telephone number from being transmitted.

A CNID device that attaches between the CNID telephone line and a PC's serial or parallel port is also currently available. This device demodulates the CNID Bell 202 data and sends it into the PC for further processing. However, this device does not collect and store information while the PC is turned off. Nor does this device allow for the dialing of the telephone number with or without a blocking prefix.

Occasionally the calling party may not want the called party to receive their telephone number. Most central office systems provide a means to block transmission of the calling party on a per-call basis through a CNID blocking prefix. However, prior to the present invention, activating this blocking feature was cumbersome and required the repeated dialing of additional digits for each blocked call. Additionally, if the calling party is serviced by a PBX, the blocking code's position depends on the type of call. In short, prior to the present invention automatic insertion or removal of the CNID blocking prefix in the number stream was not possible.

Therefore it is the objective of the present invention to provide an automatic way of insertion and removal of CNID blocking prefixes into a telephone number in a computer based telephone management system.

SUMMARY OF THE INVENTION

With Calling Number Identification (CNID) service, Frequency Shift Keying (FSK) data is sent over the telephone lines to the telephone service customer. A telephone subscriber may prevent their name/number from being transmitted to the party they are calling on a per call basis by dialing a prefix before they dial the desired number. The present invention allows for the automatic insertion/removal of that prefix in the number stream when the called party's number is dialed. This feature is accomplished by inserting a $ character into the dialing sequence. The $ is translated to the DTMF sequence necessary to prevent the transmittal of one's telephone number to a called party if the feature is enabled and is translated to a meaningless delimiter if the feature is disabled, thus allowing for a convenient means of inserting or removing the CNID blocking sequence from a number.

In order to accomplish the object of the present invention there is provided a method for automatic insertion of a prefix code from within a telephone number, where the telephone number is represented by a character string. The character string may include any number of alphabetic characters and numeric characters. A user activates the prefix code through a computer. The user must define a prefix code alias and insert the prefix code alias into the telephone number. First, the computer converts any alphabetic characters in the telephone number character string to upper case alphabetic characters. Next, any extraneous characters are removed from the telephone number character string. Any alphabetic characters in the telephone number are translated to their corresponding numeric characters. A predefined dialing format is applied to the telephone number character string. The computer determines if the prefix code was activated by the user, and if so, the first occurrence of the prefix code alias in the character string of the telephone number is expanded to the prefix code. Finally, any subsequent occurrences of the prefix code alias in the character string of the telephone number are removed.

DESCRIPTION OF THE DRAWINGS

A better understanding of the invention may be had from the consideration of the following detailed description taken in conjunction with the accompanying drawing, in which:

FIG. 3 is the Dialing Prefixes Input Screen Showing an example CNID blocking prefix.

FIG. 4 is the Local Information Screen showing a typical Calling Number ID Blocking Prefix.

FIG. 9 is the Dialing Prefixes Input Screen showing an example Prefix with no reference to the CNID blocking feature.

DESCRIPTION OF THE PREFERRED EMBODIMENT

Figure 1:
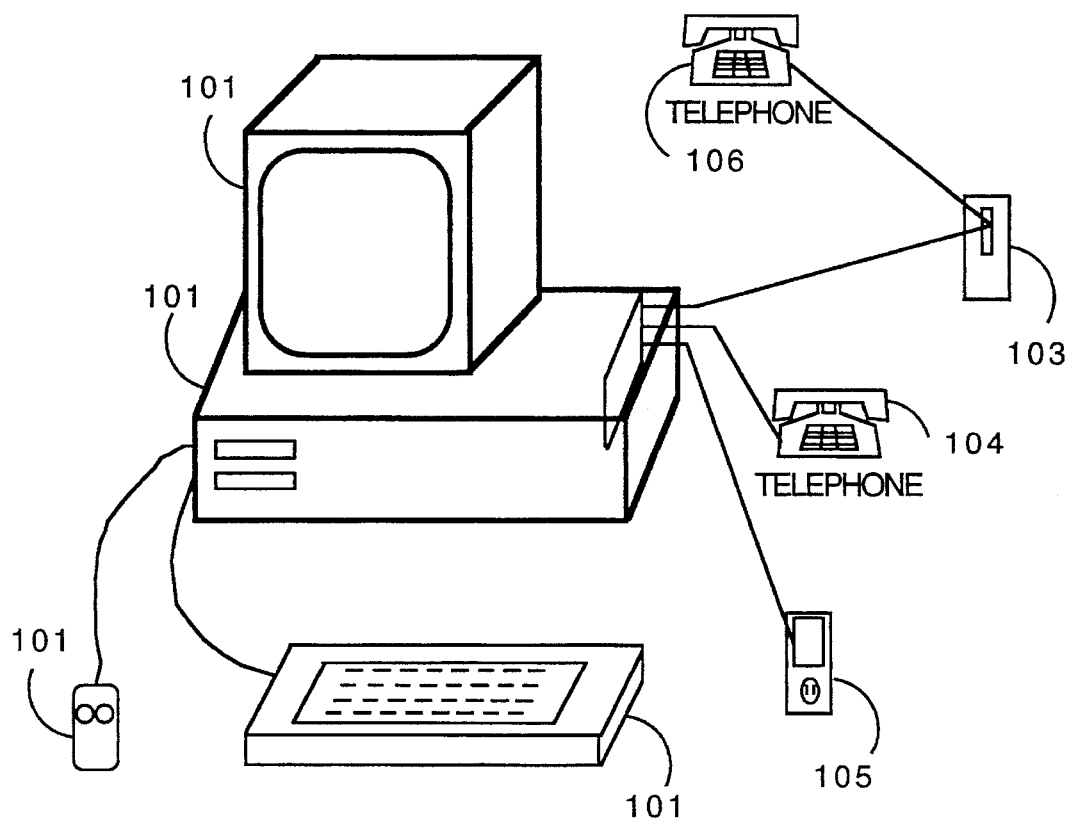
FIG. 1 is a system block diagram of the card's relationship to the host PC, external power supply, incoming telephone line and extension telephones.

The present invention is part of a hardware and software package that comprises a complete single-line call management system. The hardware consists of a PC card that is designed for personal computers. As shown in FIG. 1, the general environment is a personal computer with monitor, keyboard, and mouse 101, the card 102, and standard telephone line with CNID service 103. Extension telephones 106 are monitored for outgoing call Dual Tone Multi-Frequency (DTMF) (tone dialing) activity and on-hook/off-hook status.

Figure 2:
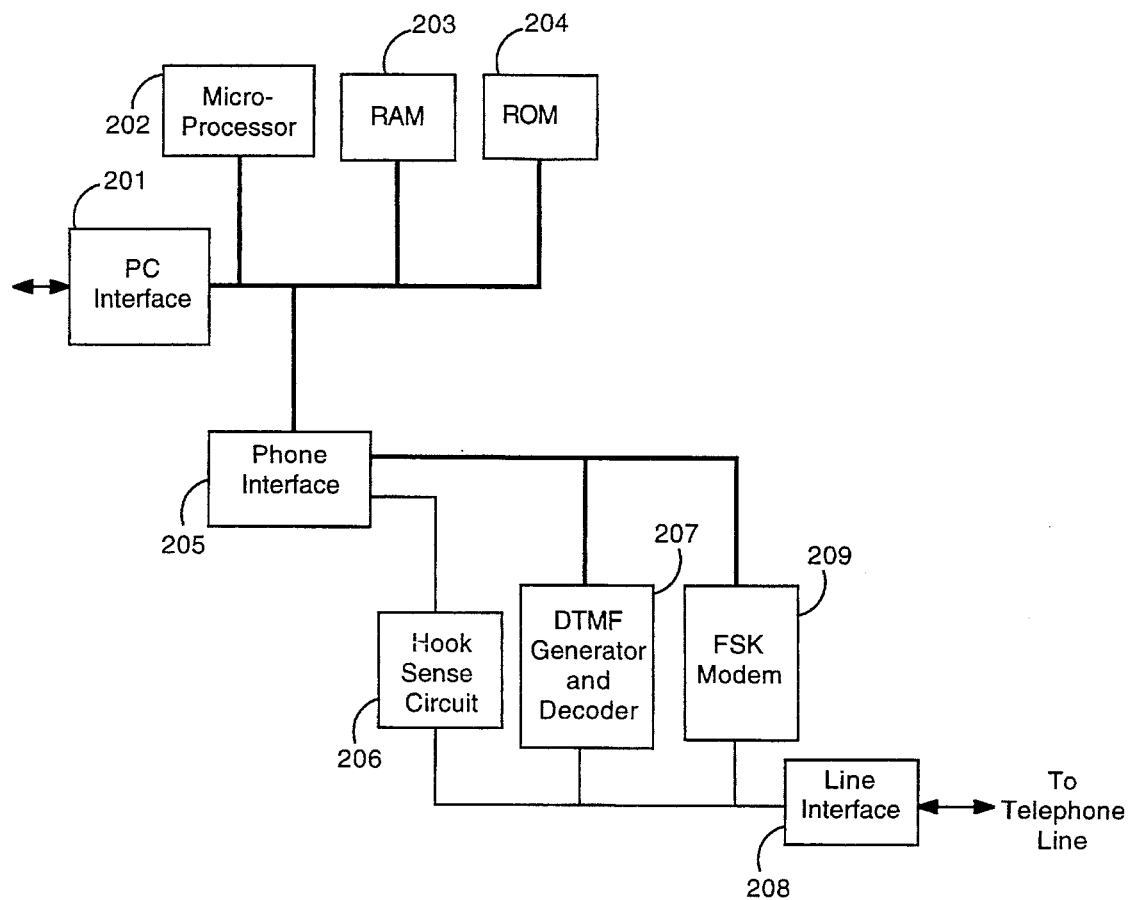
FIG. 2 is a block diagram showing the hardware aspects of the accessory card.

Referring to FIG. 2, the interfaces to the card consist of a PC Interface 201 for connecting to the host PC. A telephone line interface 208 connection. DC isolation and lightning/power cross protection are provided for by the telephone line interface 208. An external power source not shown in FIG. 2, is locally regulated on the card and a well-defined power-on-reset signal is generated to reset the card's own microprocessor at initial power-up. The portion of the card's circuitry that deals with interfacing to the PC 201 receives 5V power (VCC-PC) from the PC and is not powered when the PC is off.

The analog portion of the card 206, 207 and 209 contains an off hook sensing circuit to determine telephone line status, a DTMF generator and decoder, and an FSK Bell 103 type modem to receive and decode the calling number data. The present invention uses DTMF generator 207 to generate the proper DTMF tone to dial the desired telephone number and any required blocking prefix. The digital portion of the card 202, 203, 204, and 205 contains the microprocessor, RAM, ROM and Phone interface receptively. Alternatively, Phone interface 205 could connect directly to the PC via a serial port or directly to the PC bus.

With Calling Number Identification (CNID) service, Frequency Shift Keying (FSK) data is sent over the telephone lines to the telephone service customer. A telephone subscriber may elect to prevent their name/number from being transmitted to the party they are calling on a per call basis. Assuming the block on a per call basis feature is offered by the subscribers local telephone operating company, the subscriber can block transmission of their name/number by dialing a prefix before they dial the desired number. The present invention allows for the automatic insertion/removal of that prefix in the number stream when the called party's number is dialed. This feature is accomplished by inserting a $ character into the dialing sequence. The $ is translated to the DTMF sequence to prevent the transmittal of one's telephone number to a called party if the feature is enabled and is translated to a meaningless delimiter if the feature is disabled, thus allowing for a convenient means of inserting or removing the CNID blocking sequence from a number. The implementation is better described below.

Phone numbers dialed under the control of this software may, under the option of the user, have a dialing format associated with them. A dialing format is an action to be performed when dialing a number such as dialing a 9 before the sequence when using Private Branch Exchanges (PBX's). With numbers entered in a telephone book, the dialing format may be either "None" or one of the user defined formats. A format of "None" indicates that no additional information is to be added to, or removed from, the telephone number string.

If the user wants to optionally block their telephone number and/or name from being transmitted when they call a certain number they could create a generic dialing prefix named BLOCK_OUTGOING_CNID. This is illustrated in FIG. 3. As shown in FIG. 3, the prefix name BLOCK_OUTGOING_CNID is a user defined name for the Prefix Definition. It is shown as a $ in the example in FIG. 3. In the present invention, the $ character has a special meaning; depending on whether the CNID blocking feature is enabled or disabled, the $ is either ignored or translated to the CNID blocking prefix required by the telephone system. The prefix table of FIG. 3 represents a typical collection for a business served by either a PBX or CENTREX system. In this environment, a telephone user may make internal calls that only require a four-digit telephone number. Local calls outside the business may require a seven-digit number plus a special "outside" prefix, while long distance calls require the same "outside" prefix plus the digit 1. Many businesses also use special lines for their most often called destinations. These special lines generally use a unique prefix plus the telephone number.

The user must define the local CNID blocking prefix that is transmitted to the local telephone switch to indicate that their telephone number is not to be transmitted to the calling party. This is accomplished in the local information entry screen as shown in FIG. 4. Here, 56 is the Dual Tone Multi-Frequency (DTMF) code transmitted to the telephone switch to prevent the calling parties telephone number from being transmitted for that call. Of course, this assumes that the blocking feature is enabled by the telephone operating company for that customer.

Figure 5:
FIG. 5 is the Dial Setup Screen showing a selected Dialing Prefix with the CNID blocking feature disabled.

The Dial Setup screen of FIG. 5 allows users to define how numbers are to be dialed. While in the Dial Setup screen if the user would associate BLOCK_OUTGOING_CNID with the number 602-000-5555, the number 6020005555 would be dialed if the feature is disabled and the number 566020005555 would be dialed if the CNID Blocking feature is enabled. The setup screen would be displayed as in FIG. 5 if the CNID blocking feature was disabled.

In the Dial Setup screen the horizontal scroll bar in the lower left-hand corner as depicted in FIG. 5 indicates the number of digits of the telephone number to be associated with the Dialing Prefix. This facilitates the use of dialing sequences that use less than the full 10 digit number. An example would be local calls that do not require the area code to be dialed. Numbers that are not selected are displayed as a light shade of gray on the screen.

Figure 6:
FIG. 6 is the Dial Setup Screen showing a selected Dialing Prefix with the CNID blocking feature enabled.

The Dial Setup screen would appear as in FIG. 6 if the CNID blocking feature was enabled. FIG. 6 shows the 56 that was entered as the calling number ID prefix in FIG. 4 is inserted in front of the number to be dialed.

CNID blocking is easily enabled or disabled through use of an ICON. This ICON (FIGS. 7 and 8) is available on a majority of the GUI screens thus, allowing the CNID blocking feature to be accessed quickly and easily. The Icon's purpose is to allow the user to easily enable or disable the CNID blocking feature. When the button is in its normal state as shown below in FIG. 7, the $ character that was defined as part of the Dialing Prefix is converted to an ASCII space character SP (hexadecimal 32). Spaces within the dialing sequence are ignored, thus when disabled, the $ is ignored as part of the dialing sequence. When Blocking is enabled, as is shown in FIG. 8, the $ symbol is translated into the value specified by Calling Number ID Blocking Prefix as was shown in FIG. 4.

If the user wished to always transmit their name/number to the party they were calling they could create, for example, another format named TRANSMIT_CNID_IF_AVAILABLE. In the following example as shown in FIG. 9, any number associated with the Prefix, TRANSMIT_CNID_IF_AVAILABLE would always have their number transmitted to the calling party despite whether the CNID blocking feature was enabled or disabled. Thus, this feature is dependent on the insertion of the $ character into the number stream.

The $ symbol may be inserted anywhere a telephone number may be entered. It is not restricted to the Dialing Prefixes, however this is the most common place to utilize the symbol. The speed dial entries allow the user to type in numbers as they are to be dialed. Presently, the speed dialer does not support dialing prefixes. However, there is no restriction as to adding this capability in the future. When entering numbers into the speed dial, the user may directly embed the $ in the sequence. An example would be: 9,$602-555-5555. The $ would be treated as was explained previously. If the feature was enabled, it would be converted to the blocking sequence as defined in FIG. 4. If the feature was disabled, the $ would be converted to a space and ignored by the dialing program.

Using the specific prefixes of FIG. 3 and the generic telephone number of (602) 000-5555, if CNID blocking is disabled, the formatted telephone numbers are: a) (Internal) 5555; b) (Local) 9,000-5555; c) (Long Distance) 9,1-602-000-5555; and d) (Northlake) 8,452-5555. However, if CNID blocking is enabled the resultant telephone numbers dialed are: a) (Internal) 565555; b) (Local) 9560005555; c) (Long Distance) 95616020005555; and d) (Northlake) 84525555.

Figure 10A:
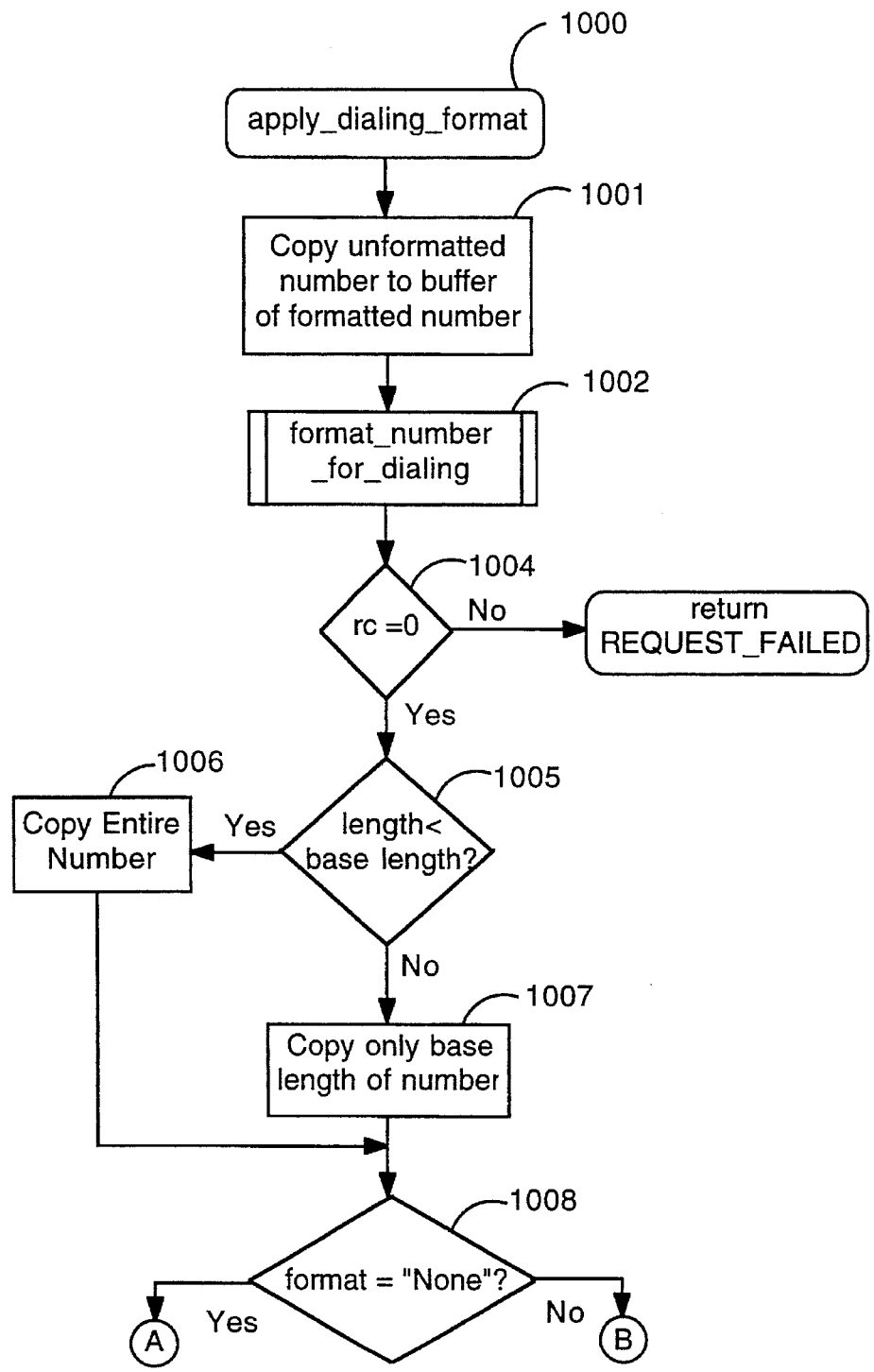
FIG. 10A–B shows the logic flow for APPLY_DIALING_FORMAT.
Figure 10B:
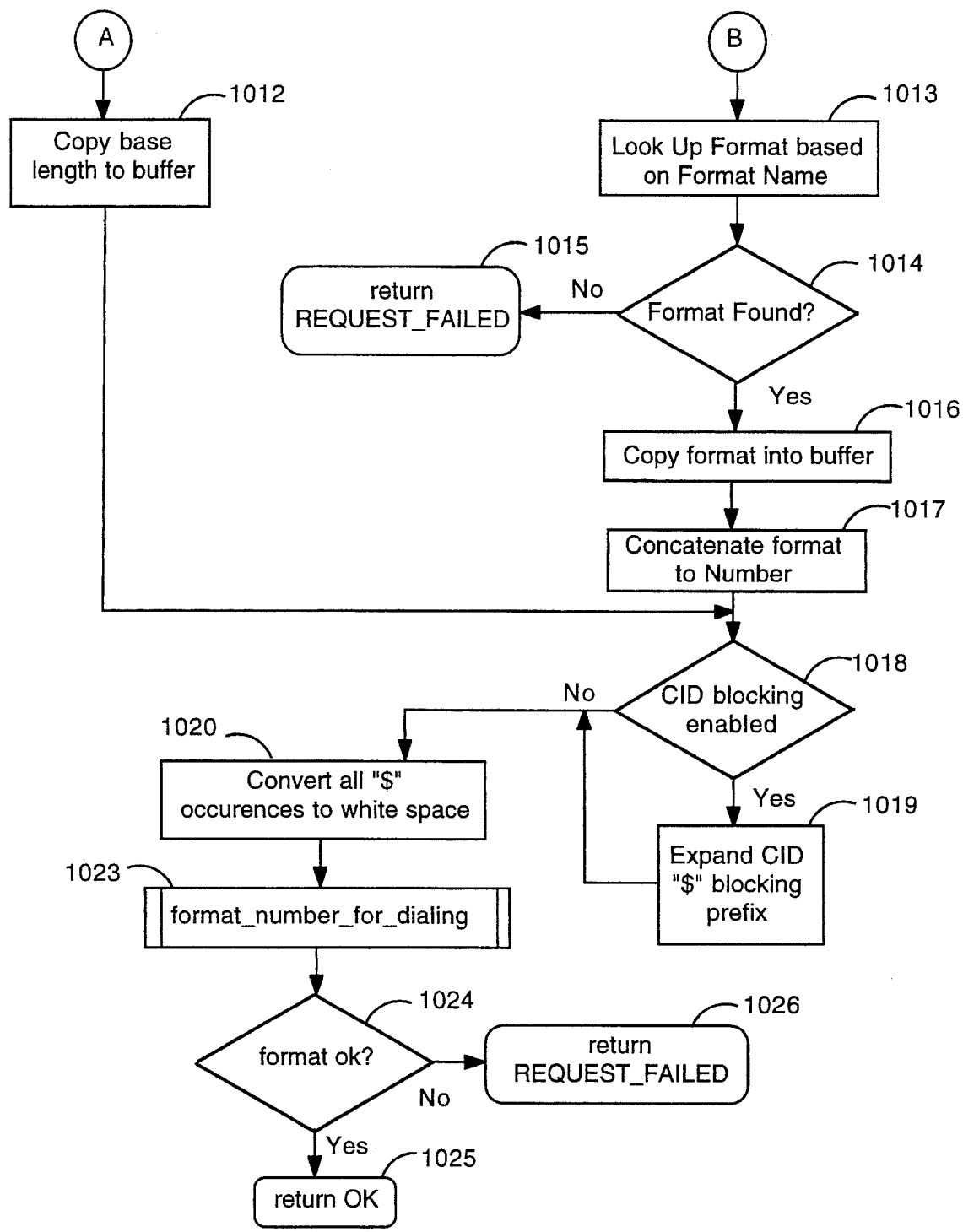

The invention may be better explained by the logic flow chart shown in FIG. 10. The main function of inserting or removing the Calling Number Identification Blocking Prefix is performed by APPLY_DIALING_FORMAT 1000. The first task of the function is to copy the given non formatted telephone number to the buffer that the final formatted telephone number will reside in 1001. The number string will be manipulated from this buffer. The next step is to invoke the function FORMAT_NUMBER_FOR_DIALING 1002. This function removes white spaces, miscellaneous formatting such as dashes between numbers, translates any alpha characters to their telephone face plate equivalent (such as the number 2 for the letters A, B, or C), and verifies that all characters entered are either a valid alpha-numeric or delimiter. Note, FORMAT_NUMBER_FOR_DIALING (FIG. 11) is described in greater detail below.

The formatting is tested 1004, if the formatting failed, an appropriate return code indicating the failure is returned 1003. If the formatting succeeds, the number is then tested against the previously entered base length 1005. The base length is the number of digits of the telephone number to be used for dialing. For instance, a seven-digit telephone number may only require the last four digits to be dialed within a PBX or Central telephone switch. If the telephone number is less than the base length it likely represent either an error or a number by number check on a telephone number being entered. Here, the user may be in the progress of typing in the number. The entire telephone number entered is used then 1006. If the telephone number is longer than the base length only the base length right most digits are copied 1007.

Next, the format is checked to see if it is the special case "None" 1008. If it is "None" the base length number of digits at most are copied to the buffer 1012. If it is not "None" in 1008, the format is looked up based on the format name that is passed to the routine 1013. If the format name is not found in the table of valid formats 1014, a return code with an appropriate failure code is passed back to the invoking program 1015. If the format is found 1014, the format string itself is copied into a buffer 1016. The telephone number to be dialed, which has now been purged of unneeded white space and delimiters and has had all alphabetic characters expanded, is concatenated onto the format in the same buffer 1017. If the CNID blocking feature is enabled, such as when the feature button is in the position in FIG. 8, the first occurrence of a "$" in the number stream is expanded to the currently defined value of the blocking prefix.

Figure 7:
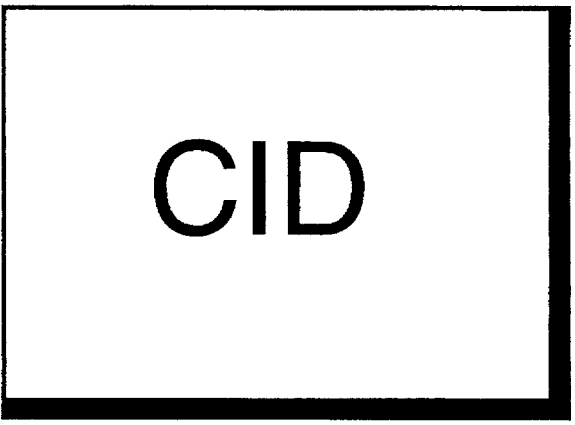
FIG. 7 is the CNID blocking feature ICON button showing the blocking feature disabled.
Figure 8:
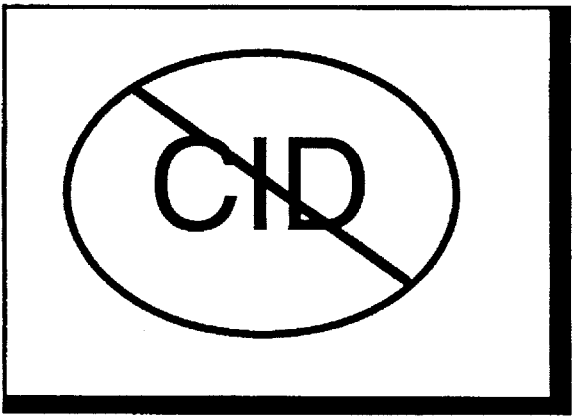
FIG. 8 is the CNID blocking feature ICON button showing the blocking feature enabled.

After the $ has been expanded or if the feature is disabled as when the feature button is in the position shown in FIG. 7, all occurrences of $ are converted to white space in the number string 1020. The number string that has now had the formatted prefix attached, has been purged of delimiters from the base length number, and has had all alphabetic characters expanded as well as the CNID blocking prefix string either inserted or converted to white space is passed to the FORMAT_NUMBER_FOR_DIALING function 1023 one more time. This second pass through this routine removes any white space inserted from additional $s that were converted to white space also any delimiters in the Dialing Prefix that is now concatenated to the number. This final format is tested in 1024. If it failed to be formatted, an appropriate return code is passed back to the invoking routine. If it is successful, a successful return code is returned 1025.

Figure 11A:
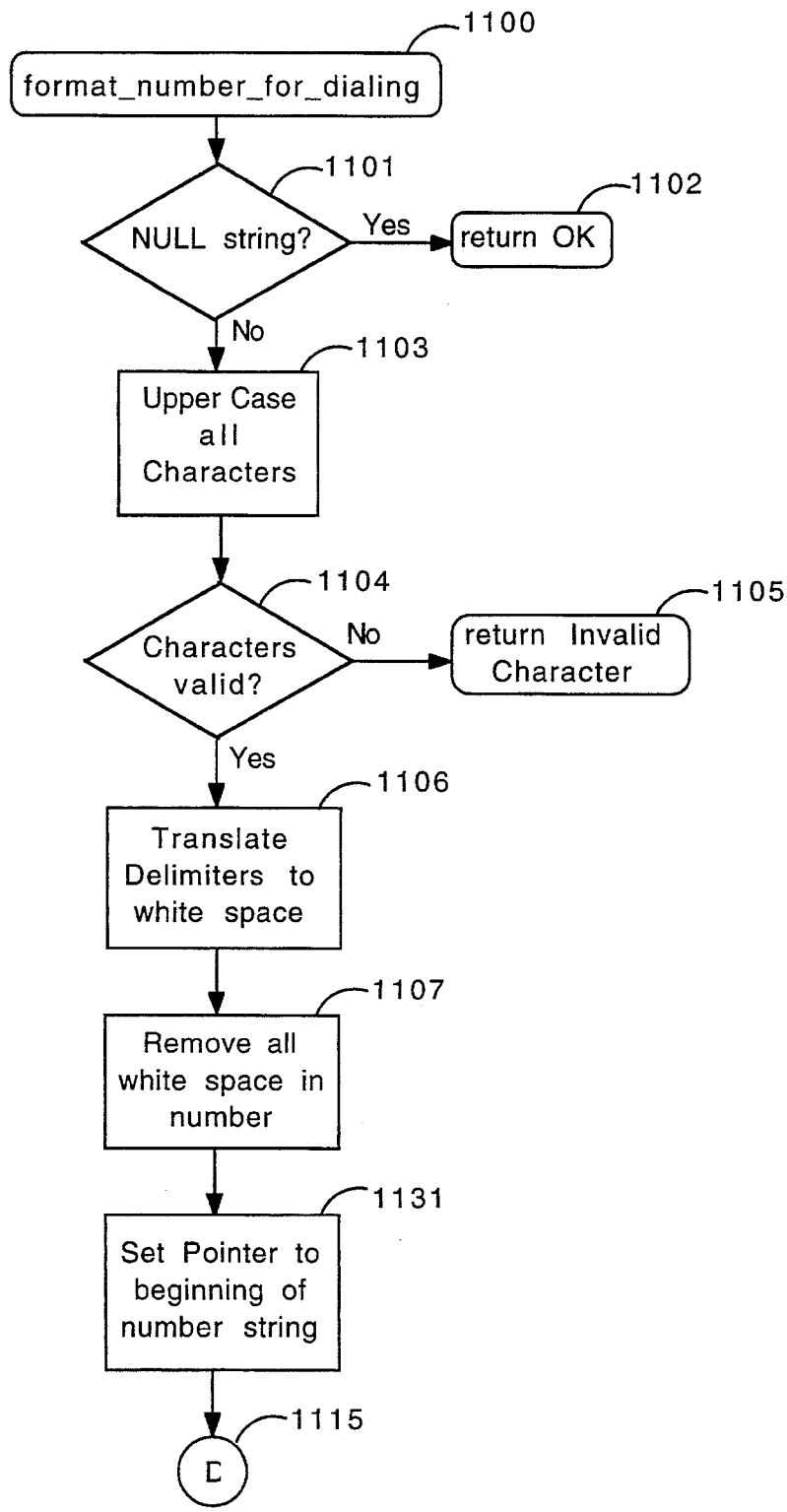
FIG. 11A–B shows the logic flow for FORMAT_NUMBER_FOR_DIALING.
Figure 11B:
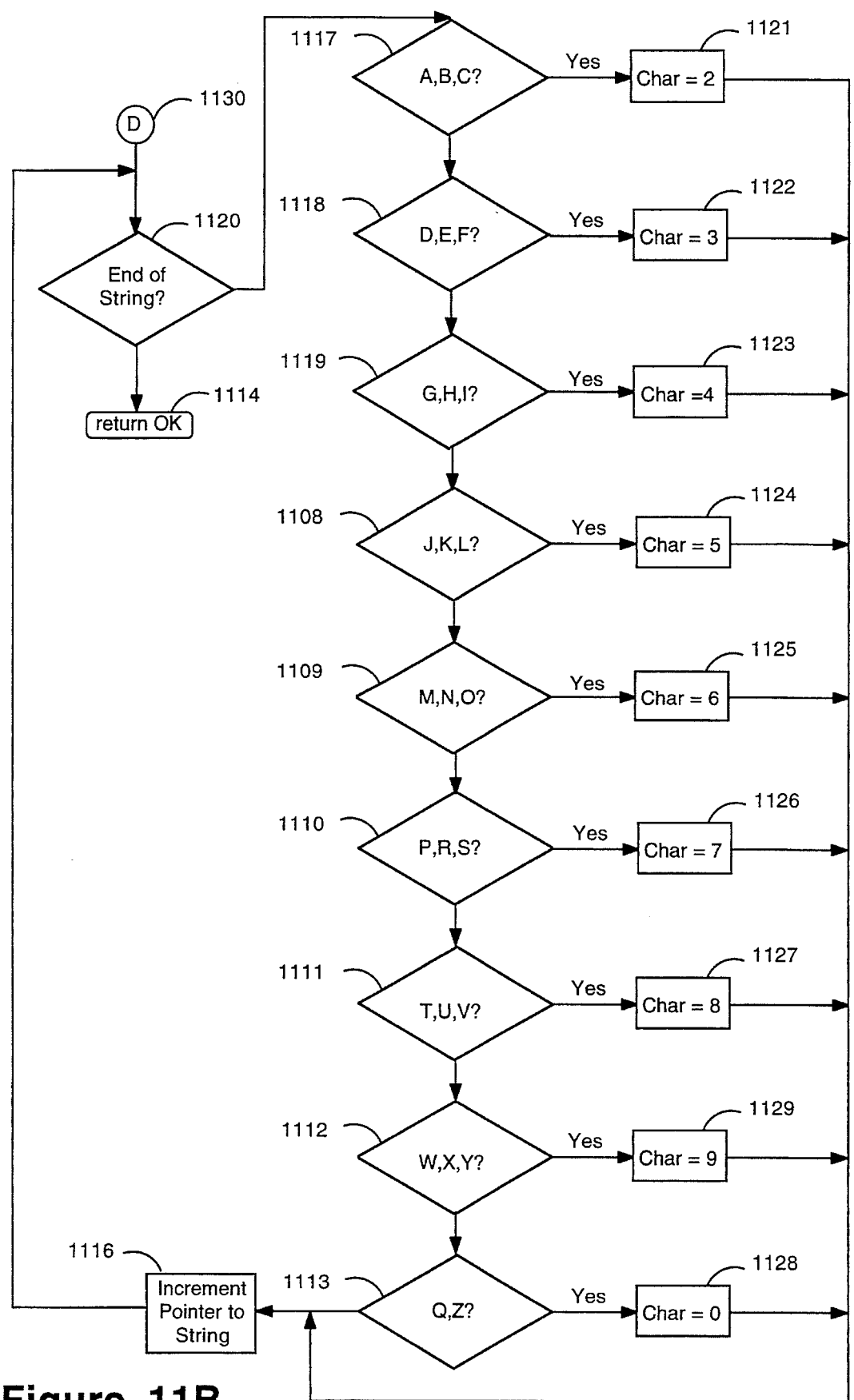

The FORMAT_NUMBER_FOR_DIALING function is invoked by APPLY_DIALING_FORMAT, FORMAT_SPEED_NUMBER_FOR_DIALING, and others. This function, which was described from a high level view in the previous explanations, performs many parsing operations on the number string. Its' logic is shown in FIG. 11. Once invoked 1100, the number passed is first checked to see if it is non existent (NULL). If it is, test 1101 returns a successful return code because a nonexistent string can be dialed, but nothing will happen 1102. If it is not NULL, all lower case characters are converted to upper case characters 1103. The characters are then compared to a list of valid characters such as those alphabetic characters that appear on most telephone face plates and may be converted to a number equivalent. If invalid characters are found 1104, an appropriate return code is returned 1105. If the string contains all valid characters, the string is then parsed for valid delimiters. A delimiter may be a dash "-" a period ".", a forward or back slash "/" or "\", a left or right parenthesis "(", ")" or any other character that is appropriate as a delimiter. These delimiters are changed to an ASCII white space in every instance 1106. The entire string is then parsed and all white spaces are removed from the string 1107.

Next, a pointer is position to the beginning of the number string 1131. Character by character the string is checked for alphabetic characters that appear on most telephone face plates. If A, B, or C is found 1117 it is converted into a "2" in 1121. If D, E, or F is found 1118 it is converted into a "3" 1122. If G, H, or I is found 1119, it is converted into a "4" 1123. If J, K, or L is found 1108, it is converted into a "5" 1124. If M, N, or O is found 1109, it is converted into a "6" 1125. If P, R, or S is found 1110, it is converted into a "7" 1126. If T, U, or V is found 1111, it is converted into a "8" 1127. If W, X, or Y is found 1112, it is converted into a "9" 1129. If Q or Z is found 1113, it is converted into a "0" 1128. The conversion of Q or Z to a "0" is in support of some newer telephones which place these letters by the "0". Older telephones did not support these characters on their face plates. The translations performed are typical of North American Telephones. Telephones from other countries may support other characters on their face plates. Though this invention currently does not support the translation of other characters, it would be a natural enhancement to support any additional characters.

Once a character has been translated, the pointer to the number string is incremented 1116. The string is then tested to see if the pointer is pointing at the end of the string 1120. If it is, all conversion is complete and an appropriate successful return code is passed back to the invoking routine 1114. If it if not at the end of the string 1120, the logic returns to 1117 where the characters are once again checked for translation from alphabetic to numeric ASCII characters.

The $ was chosen as a commonly available key on most computer keyboards. The character itself is arbitrary and could have been any available character other than the digits 0 through 9, the #, or the. Additionally, other special keys such as a comma "," or a delimiter such as a dash or a period "-" or "." are not available to use as the CNID blocking code. A key word could have also been used instead of the $ symbol. An example would be CNID_BLOCKING. Again any keyword recognizable by the software could be utilized. It should not be misunderstood, the $ has been hard coded into the system, only the prefixes are user defined. However, any of the above symbols could have been hard coded in to the system.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for automatic insertion of a prefix code from within a telephone number, said telephone number being represented by a character string, said character string including a plurality of alphabetic characters and a plurality of numeric characters, a computer telephone management system for performing said method, said computer telephone management system being operated by a user, said user activating said prefix code through said computer telephone management system, said user defining a prefix code alias and inserting said prefix code alias into said telephone number, said method comprising the steps of:

first removing extraneous characters from said character string of said telephone number;

translating said plurality of alphabetic characters in said telephone number to their corresponding plurality of numeric characters;

adding a predefined format information to said character string of said telephone number;

determining if said prefix code is activated by said user;

expanding a first occurrence of said prefix code alias in said character string of said telephone number to said prefix code if said step of determining determines that said prefix code is activated; and second removing subsequent occurrences of said prefix code alias in said character string of said telephone number.

2. A method as claimed in claim 1 wherein said step of first removing further including the step of:

converting said plurality of alphabetic characters in said telephone number to a plurality of upper case alphabetic characters.

* * * * *